Nov. 23, 1926.
M. HANULJAK
MOUSE AND RAT TRAP
Filed August 19, 1926
1,607,949
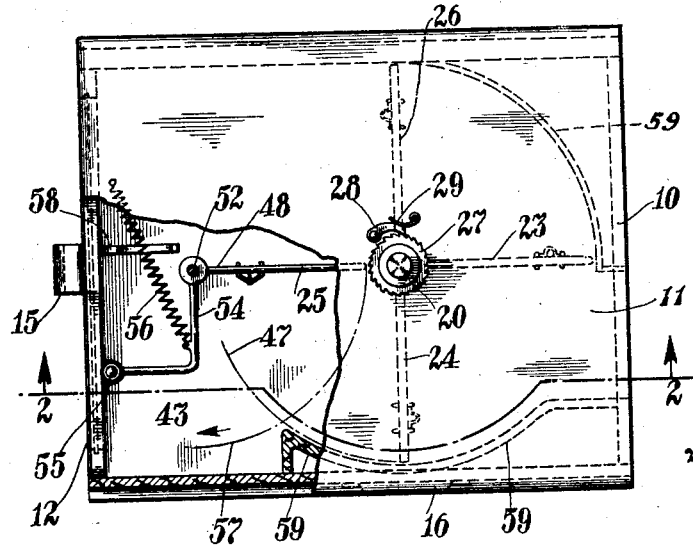
*Fig. 1.*
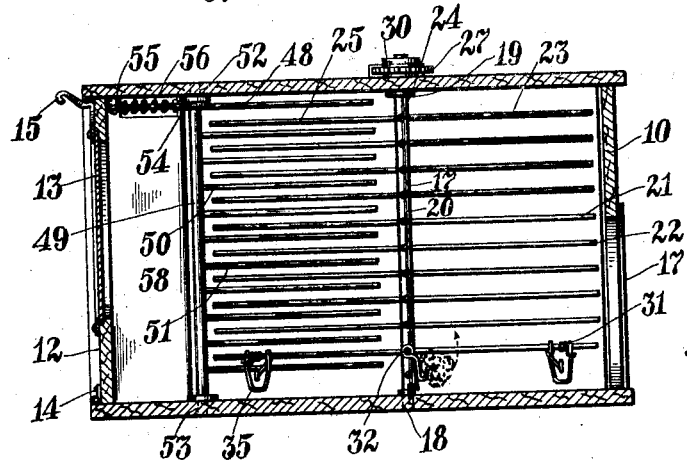
*Fig. 2.*
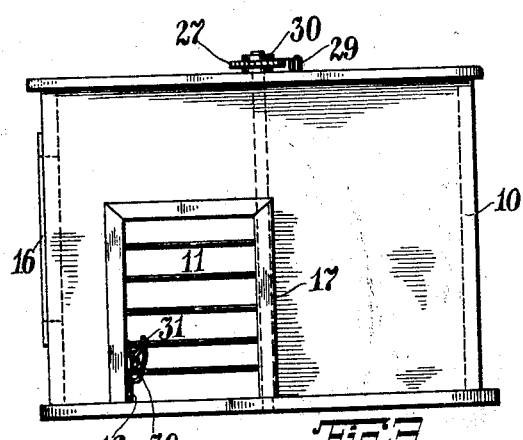
*Fig. 3.*
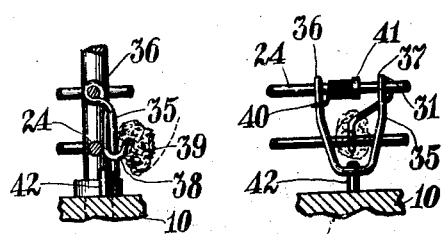
*Fig. 5.*  *Fig. 4.*
INVENTOR
Matus Hanuljak
BY
ATTORNEY Patented Nov. 23, 1926.

1,607,949

UNITED STATES PATENT OFFICE.

MATUŚ HANULJAK, OF CLEVELAND, OHIO.

MOUSE AND RAT TRAP.

Application filed August 19, 1926. Serial No. 130,123.

This invention relates to animal traps, and especially to those intended for catching mice, rats and like rodents.

Its principal object is to provide a device of this character which will catch and confine the said rodents without crushing, or other mutilation.

It is a well known fact that traps which are smeared with blood, or have had parts of their structure in contact with the crushed bodies of the animals, retain an odor from this contact which is very apparent to the sensitive smelling organs of like creatures. This odor, when present tends to warn the animals of the danger of the trap and greatly lessens its efficiency.

In this device the animal is lured by easy stages into a confining chamber from which it is impossible for it to escape. The bait is provided in several units and each of these is capable of enticing several animals into the trap chamber.

There are no triggers to set, or parts to be handled which might scratch, or otherwise injure a person while engaged in preparing the trap for use.

Objects and features other than those above mentioned will be disclosed and fully described in the following specification and illustrated in the accompanying drawings, in which:—

Fig. 1 shows a top view of the trap with a portion broken away to disclose a part of the confining chamber.

Fig. 2 shows a vertical section on the line 2—2 of Figure 1.

Fig. 3 shows a front end view.

Fig. 4 shows an enlarged view of the bait holder with fragmentary portions of the adjacent structure.

Fig. 5 shows a side view of the element illustrated in Figure 4.

Referring now to Figures 1 and 2 of the drawings, the device comprises a casing 10 having an entrance 11 in one end and a hinged door 12 at the other. A window 13 in the said door permits of a view of the interior of the trap. This door swings downward, being hinged at the bottom as shown at 14 and provided with a spring catch 15 at the top. A side window is provided at 16 which gives further light to the interior and particularly that portion in which the bait normally rests.

A revolvable gate element, or stile 17 is mounted within the casing and rests on a pivot bearing 18 at the bottom and in a suitable sleeve 19 at the top. The main shaft 20 of this element is provided with outward extending bars as those shown at 21, 22 etc. which are set in such a way as to present four barriers 23, 24, 25 and 26, each at a right angle to the other. A ratchet disk 27 is affixed to the upper extremity of the main shaft and is engaged by the pawl 28 which is under pressure of the spring 29. A turning knob 30 is set above the said ratchet disk.

Mounted on the lower portions of each of the said barriers are bait holders as shown at 31, 32 etc. These may best be described with reference to Figures 4 and 5 of the drawings. The said bait holders are constructed as follows, a frame 35 is formed of suitable wire and looped around a bar of the barrier as shown at 36 and 37. On one side the said wire passes under the frame, and extending to a central position, is formed in a hook 38, on which may be placed the bait 39. On the opposite side the frame is under pressure of the coil spring 40 which, being wrapped around the barrier bar, is secured at the center by the ring 41 which may be compressed, soldered, or otherwise affixed.

It will be seen that the holder rests with its back against a bar of the barrier, but is adapted to be lifted by any tugging on the bait such as would be exerted by a mouse, or the like. When thus lifted it clears the stop pin 42 which otherwise holds the barrier in its set position. This permits of the backward movement of the said barrier which occurs as the animal nibbles at the bait. The barrier thus moving backward lures the animal into the confinement chamber 43 at the back of the trap.

Referring now, to Figures 1 and 2 of the drawings, a back-stop 48 which is similar in construction to the stile before mentioned, except that it has only one set of bars, is mounted in such a position that its main shaft 49 is adjacent to the line 47 of the arc of the aforesaid stile and its bars as shown at 50, 51 etc. are set to alternate with those of the said stile. This back-stop is pivoted at the top and bottom as shown at 52 and 53 and is provided with a retaining bar 54 which is angular in shape and has at its free end a rounded portion 55 which bears against the trap door when in closed position. A tension spring 56 is attached to the said bar and to the casing of the trap.

It will be seen that while this back-stop prevents the animals from escaping from the chamber in pursuance of the bait, it also serves to throw them out of the said chamber when the trap door is opened for that purpose, as it swings in the arc indicated by the arrow 57.

A partition 58 closes the rear portion of the confining chamber, and a curved wall 59 prevents the animals from passing around the outer ends of the barrier bars when same are in their intermediate positions.

In operation, the animal enters through the aperture 11 and by nibbling at the bait, first releases the holder from the stop pin and then by his continued efforts to remove, or eat the said bait, pushes the barrier backward until it reaches the back-stop, where it will rest until further moved by the efforts of another animal to secure the bait from the barrier next in line. When this occurs, the first bait holder rides upward and over the adjacent back-stop bar and then snaps back into its first position.

While I have shown and described the preferred embodiment of my invention, I do not wish to be held rigidly to the exact details of construction as illustrated, but claim the right to such minor modifications as may come within the scope of the appended claims.

Having thus described my invention, what I claim as new and desire to secure by Letters Patent, is as follows:

1. In an animal trap, a casing having an open entrance aperture, and pivotally mounted within the said casing, a gate element having radially disposed, spaced barrier members and means to check the said element against revolution in a reversed direction, and pivotally mounted adjacent to the line of the arc of revolution of the said gate element, a back-stop comprising a supporting member and outward projecting, spaced members adapted to permit of the passage of the aforementioned barrier members, and a retaining bar secured to the said supporting member and adapted to contact at its free end with a portion of the closure member of an exit aperture, and means to exert a turning tension on the said back-stop, and means for the attachment of bait material on portions of the said gate element, substantially as shown and described.

2. In an animal trap, a suitable casing having an open entrance aperture and a closable exit, and mounted within the said casing, a revolvable gate element having spaced barrier members, and a back-stop adapted to co-act therewith and to permit of the passage of the said barrier members, and mounted on certain of the said spaced members, bait holders each comprising a bent wire frame looped about the said barrier member and having a tension spring adapted to exert a backward pressure on same and the said wire so bent as to provide a hook member thereon, substantially as shown and described.

In testimony whereof I have affixed my signature.

MATUŠ HANULJAK.